US010838076B2

(12) United States Patent
Onomura et al.

(10) Patent No.: US 10,838,076 B2
(45) Date of Patent: Nov. 17, 2020

(54) SELF-POSITION MEASURING DEVICE, SELF-POSITION MEASURING METHOD, AND NON-TRANSITORY STORAGE MEDIUM (71) Applicant: SUBARU CORPORATION, Tokyo (JP)

(72) Inventors: Yoichi Onomura, Tokyo (JP); Akihiro Yamane, Tokyo (JP); Yukinobu Tomonaga, Tokyo (JP); Takeshi Fukurose, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 276 days.

(21) Appl. No.: 16/020,638

(22) Filed: Jun. 27, 2018

(65) Prior Publication Data
US 2019/0056512 A1 Feb. 21, 2019

(30) Foreign Application Priority Data
Aug. 17, 2017 (JP) .................................. 2017-157301

(51) Int. Cl.
G01S 19/47 (2010.01)
G01C 21/16 (2006.01)
(Continued)

(52) U.S. Cl.
CPC ............ *G01S 19/47* (2013.01); *G01C 21/005* (2013.01); *G01C 21/02* (2013.01); *G01C 21/165* (2013.01);
(Continued)

(58) Field of Classification Search
CPC .......... G01S 19/47; G01S 19/48; G01S 19/49; G06F 16/29; G08G 5/0047; G08G 5/0069; G01C 21/005; G01C 21/165
See application file for complete search history.

(56) References Cited

U.S. PATENT DOCUMENTS 5,483,456 A 1/1996 Kuwahara et al.
2002/0047895 A1* 4/2002 Bernardo .............. G06T 3/4038
348/48
(Continued)

FOREIGN PATENT DOCUMENTS

EP 2133662 A2 12/2009
JP 02-021508 U 2/1990
(Continued)

OTHER PUBLICATIONS

Japanese Office Action issued in corresponding Japanese Patent Application No. 2017-157301, dated Jun. 4, 2019, with English Translation.

*Primary Examiner* — Harry K Liu
(74) *Attorney, Agent, or Firm* — McDermott Will & Emery LLP (57) ABSTRACT A self-position measuring device includes an information generator, a position extractor, and a navigation method selector. The information generator generates estimated information that is expected to be obtained when at least one of the ground information and the celestial information is obtained, at each of multiple reference points generated on the basis of measured inertial navigation position. The position extractor checks at least the one of the ground information and the celestial information against the estimated information at each of the multiple reference points and extracts a position of a specific reference point corresponding to specific estimated information with a highest matching degree. The navigation method selector selects, on the basis of the specific reference point, a navigation method with less navigational error as a navigation method for measuring the self-position.

13 Claims, 6 Drawing Sheets (51) Int. Cl.
  *G08G 5/00* (2006.01)
  *G01C 21/00* (2006.01)
  *G06F 16/29* (2019.01)
  *G01S 19/48* (2010.01)
  *G01C 21/02* (2006.01)
  *G01S 19/49* (2010.01)

(52) U.S. Cl.
  CPC .............. *G01S 19/48* (2013.01); *G01S 19/49* (2013.01); *G06F 16/29* (2019.01); *G08G 5/0047* (2013.01); *G08G 5/0069* (2013.01)

(56) References Cited

U.S. PATENT DOCUMENTS

| | | | |
|---|---|---|---|
| 2015/0046017 A1 | 2/2015 | Torti et al. | |
| 2017/0328716 A1* | 11/2017 | Ma | G06K 9/6249 |
| 2018/0284293 A1* | 10/2018 | Pan | G01S 19/43 |

FOREIGN PATENT DOCUMENTS

| | | | |
|---|---|---|---|
| JP | 05-181417 A | | 7/1993 |
| JP | 06-148307 A | | 5/1994 |
| JP | 2007-292729 A | | 11/2007 |
| JP | 2007292729 A | * | 11/2007 |
| JP | 2008-175716 A | | 7/2008 |
| JP | 2008-304260 A | | 12/2008 |
| JP | 2009-294214 A | | 12/2009 |
| JP | 2015-031699 A | | 2/2015 |
| KR | 101440690 B1 | * | 9/2014 |

* cited by examiner

| CONDITIONS | GPS RECEPTION STATE | UNSATIS-FACTORY | SATISFACTORY | | | | | | | |
|---|---|---|---|---|---|---|---|---|---|---|
| | INERTIAL NAVIGATION MEASUREMENT PROPRIETY | — | — | — | — | AVAILABLE | AVAILABLE | AVAILABLE | — | — |
| | GEONAVIGATION MEASUREMENT PROPRIETY | — | — | AVAILABLE | AVAILABLE | — | UNAVAILABLE | UNAVAILABLE | — | — |
| | CELONAVIGATION MEASUREMENT PROPRIETY | — | AVAILABLE | — | — | — | AVAILABLE | UNAVAILABLE | — | — |
| | GPS POSITION — DIFFERENCE FROM INERTIAL NAVIGATION POSITION | — | — | — | — | WITHIN THRESHOLD | EXCEED THRESHOLD | — | WITHIN THRESHOLD | EXCEED THRESHOLD |
| | GPS POSITION — DIFFERENCE FROM GEONAVIGATION POSITION | — | — | WITHIN THRESHOLD | EXCEED THRESHOLD | — | — | WITHIN THRESHOLD | — | — |
| | GPS POSITION — DIFFERENCE FROM CELONAVIGATION POSITION | — | — | — | — | — | — | EXCEED THRESHOLD | — | — |
| GPS USE PROPRIETY | | UNSUITABLE | SUITABLE | SUITABLE | UNSUITABLE | SUITABLE | UNSUITABLE | SUITABLE | SUITABLE | UNSUITABLE |

SELF-POSITION MEASURING DEVICE, SELF-POSITION MEASURING METHOD, AND NON-TRANSITORY STORAGE MEDIUM

CROSS-REFERENCE TO RELATED APPLICATIONS

The present application claims priority from Japanese Patent Application No. 2017-157301 filed on Aug. 17, 2017, the entire contents of which are hereby incorporated by reference.

BACKGROUND

The technology relates to a self-position measuring technique of a movable body.

Currently, a method using a global positioning system (GPS) is widely used in self-position measurement of a movable body, such as an unmanned aerial vehicle (UAV).

A self-position measuring technique without using an external signal such as a GPS signal may be performed by geonavigation or celonavigation. This technique is, for example, disclosed in Japanese Unexamined Patent Application Publication (JP-A) Nos. 2009-294214 and 2015-031699.

SUMMARY

An aspect of the technology provides a self-position measuring device that includes an inertial navigation unit, a database of at least one of geographic information and celestial information, a reference point generator, an information obtaining unit, an information generator, a position extractor, a navigation method selector. The inertial navigation unit is configured to measure an inertial navigation position as a self-position of a movable body. The reference point generator is configured to estimate an existing region of the movable body on the basis of the inertial navigation position measured as the self-position by the inertial navigation unit and divide the existing region to generate multiple reference points. The information obtaining unit is configured to obtain at least one, of the ground information and the celestial information, which corresponds to the database, at the inertial navigation position. The information generator is configured to generate estimated information that is expected to be obtained when at least the one of the ground information and the celestial information is obtained, at each of the multiple reference points on a basis of the database. The position extractor is configured to check at least the one of the ground information and the celestial information, against the estimated information at each of the multiple reference points and extract a position of a specific reference point corresponding to specific estimated information with a highest matching degree. The navigation method selector is configured to select, on the basis of the specific reference point, a navigation method with less navigational error as a navigation method for measuring the self-position, from among multiple navigation methods including a navigation method using the inertial navigation unit and a navigation method determining the position of the specific reference point.

An aspect of the technology provides a self-position measuring method executed by a self-position measuring device, the self-position measuring device including: an inertial navigation unit configured to measures an inertial navigation position as a self-position of a movable body; and a database of at least one of geographic information and celestial information, the self-position measuring method including: estimating an existing region of the movable body on the basis of the inertial navigation position measured as the self-position by the inertial navigation unit and dividing the existing region to generate multiple reference points; obtaining at least one, of the ground information and the celestial information, which corresponds to the database, at the inertial navigation position; generating estimated information that is expected to be obtained when at least the one of the ground information and the celestial information is obtained, at each of the multiple reference points on a basis of the database; checking at least the one of the ground information and the celestial information, against the estimated information at each of the multiple reference points and extracting a position of a specific reference point corresponding to specific estimated information with a highest matching degree; and selecting, on the basis of the specific reference point, a navigation method with less navigational error as a navigation method for measuring the self-position, from among multiple navigation methods including a navigation method using the inertial navigation unit and a navigation method determining the position of the specific reference point.

An aspect of the technology provides a non-transitory storage medium storing a self-position measuring program that causes a self-position measuring device to execute a method. The self-position measuring device includes: an inertial navigation unit configured to measure an inertial navigation position as a self-position of a movable body; and a database of at least one of geographic information and celestial information. The method includes: estimating an existing region of the movable body on the basis of the inertial navigation position measured as the self-position by the inertial navigation unit and dividing the existing region to generate multiple reference points; obtaining at least one, of the ground information and the celestial information, which corresponds to the database, at the inertial navigation position; generating estimated information that is expected to be obtained when at least the one of the ground information and the celestial information is obtained, at each of the multiple reference points on the basis of the database; checking at least the one of the ground information and the celestial information, against the estimated information at each of the multiple reference points and extracting a position of a specific reference point corresponding to specific estimated information with a highest matching degree; and selecting, on the basis of the specific reference point, a navigation method with less navigational error as a navigation method for measuring the self-position, from among multiple navigation methods including a navigation method using the inertial navigation unit and a navigation method determining the position of the specific reference point.

An aspect of the technology provides a self-position measuring device that includes an inertial navigation unit, a database of at least one of geographic information and celestial information, and circuitry. The inertial navigation unit is configured to measure an inertial navigation position as a self-position of a movable body. The circuitry is configured to estimate an existing region of the movable body on the basis of the inertial navigation position measured as the self-position by the inertial navigation unit and divide the existing region to generate multiple reference points, obtain at least one, of the ground information and the celestial information, which corresponds to the database, at the inertial navigation position, generate estimated information that is expected to be obtained when at least the one of the ground information and the celestial information is obtained, at each of the multiple reference points on the basis of the database, check at least the one of the ground information and the celestial information, against the estimated information at each of the multiple reference points and extract a position of a specific reference point corresponding to specific estimated information with a highest matching degree, and select, on the basis of the specific reference point, a navigation method with less navigational error as a navigation method for measuring the self-position, from among multiple navigation methods including a navigation method using the inertial navigation unit and a navigation method determining the position of the specific reference point.

DETAILED DESCRIPTION

In the following, some implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

Currently, a method using a global positioning system (GPS) is widely used in self-position measurement of a movable body, such as a UAV.

However, in the method using a GPS, in a case where a GPS unit is deceived or is jammed by an impersonated and false GPS signal, it is difficult for a movable body to correctly recognize the self-position, and in the worst case, the movable body will stray off the course or crash.

A self-position measuring technique without using an external signal such as a GPS signal may be performed by geonavigation or celonavigation.

For example, according to the method of geonavigation disclosed in JP-A No. 2009-294214, topographic information obtained by using laser or other unit is checked against a topographic structure database to estimate a position.

In another example, according to the method of celonavigation disclosed in JP-A No. 2015-031699, data collected by using a camera or other unit is compared with position information stored in a celestial body database to calculate a self-position of an unmanned aircraft.

However, each of this method of geonavigation and this method of celonavigation requires a process of checking database containing enormous amount of data, which causes an increase in calculation load and an increase in processing time.

A self-position of a movable body is desirably measured at high accuracy in self-position measurement.

It is desirable to provide a self-position measuring device a self-position measuring method, and a self-position measuring program that make it possible to measure a self-position of a movable body at high accuracy.

[Configuration of Self-Position Measuring Device]

First, a configuration of a self-position measuring device 10 according to an implementation of the technology will be described.

Figure 1:
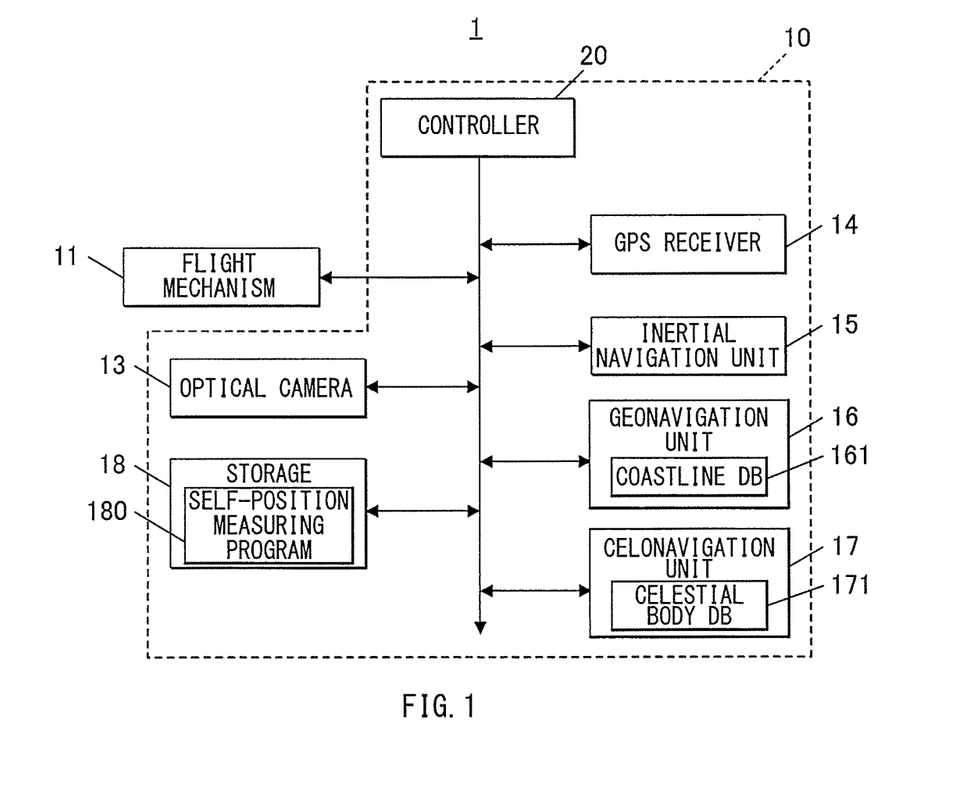
FIG. 1 is a block diagram illustrating a functional configuration of an unmanned vehicle equipped with a self-position measuring device.
Figure 2:
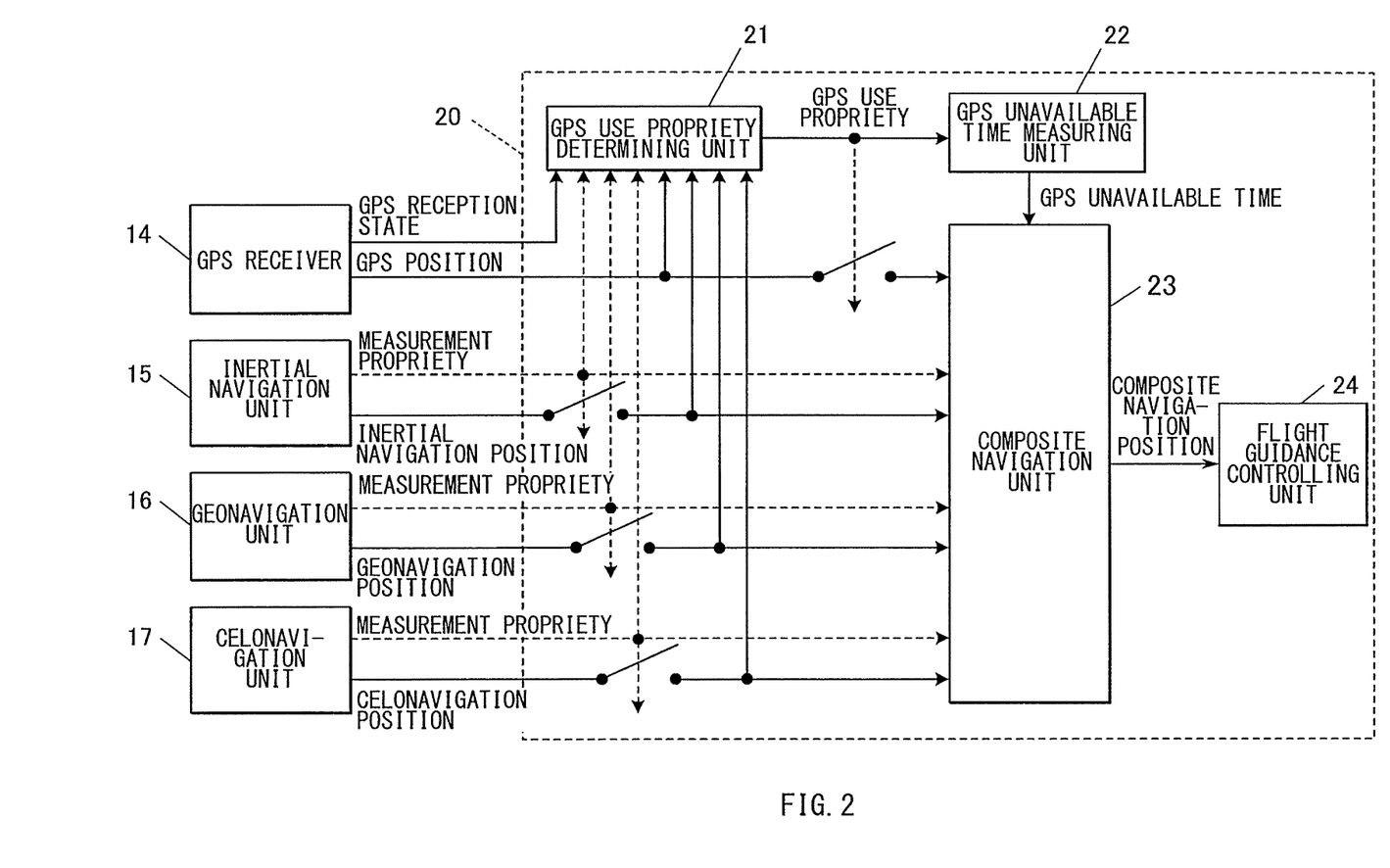
FIG. 2 is a block diagram illustrating an internal configuration of a controller of the self-position measuring device.

FIG. 1 is a block diagram illustrating an outline of a functional configuration of an unmanned vehicle 1 equipped with the self-position measuring device 10. FIG. 2 is a block diagram illustrating an internal configuration of a controller 20 of the self-position measuring device 10.

As illustrated in FIG. 1, the self-position measuring device 10 may be configured to be mounted on the unmanned vehicle 1 and may measure a self-position of the unmanned vehicle 1. The unmanned vehicle 1 may be an unmanned aerial vehicle. For example, the self-position measuring device 10 may perform self-position measurement at accuracy higher than the accuracy of the self-position measurement performed only by the inertial navigation unit 15 of the unmanned vehicle 1.

The unmanned vehicle 1 may include a flight mechanism 11 that makes the unmanned vehicle 1 fly and may also include an optical camera 13, a global positioning system (GPS) receiver 14, an inertial navigation unit 15, a geonavigation unit 16, a celonavigation unit 17, a storage 18, and a controller 20.

The self-position measuring device 10 may include, among these units, the optical camera 13, the GPS receiver 14, the inertial navigation unit 15, the geonavigation unit 16, the celonavigation unit 17, the storage 18, and the controller 20.

The optical camera 13 may be an imaging unit that respectively obtains image information of a ground and image information of the sky or a celestial body in the implementation of the technology.

The optical camera 13 may be used by both the geonavigation unit 16 and the celonavigation unit 17, and thus, the optical camera 13 may be provided to each of the geonavigation unit 16 and the celonavigation unit 17.

The GPS receiver 14 may receive a GPS signal containing information on a self-position, which is a current position, of the unmanned vehicle 1, from a GPS satellite. The GPS receiver 14 may output, for example, a reception state of the GPS signal and information on the self-position of the unmanned vehicle 1 obtained from the GPS signal, to the controller 20. Hereinafter, the self-position of the unmanned vehicle 1 obtained from the GPS signal is referred to as a "GPS position".

The "reception state of the GPS signal" may refer only to the quality of the signal reception condition and may not be related with the authenticity and the information accuracy of the GPS signal itself. Thus, a GPS signal may be possibly an impersonated and false GPS signal even if the reception state of the GPS signal is satisfactory, in some cases.

The inertial navigation unit 15 may measure a position, a velocity, and other factors of the unmanned vehicle 1 by using a gyroscope or an accelerometer, without using radio waves from outside. The inertial navigation unit 15 may output a measurement propriety signal and information on a self-position of the unmanned vehicle 1 obtained by the inertial navigation unit 15, to the controller 20. The measurement propriety signal may contain information indicating the propriety of execution of the position measurement. Hereinafter, the self-position of the unmanned vehicle 1 obtained by the inertial navigation unit 15 is referred to as an "inertial navigation position". The inertial navigation unit 15 may also output an inertial navigation position by adding correction thereto on the basis of the GPS position to reduce accumulation of measurement errors.

The geonavigation unit 16 may obtain information on a self-position of the unmanned vehicle 1 on the basis of the shape of a coastline observed from the unmanned vehicle 1 in the implementation of the technology. For example, the geonavigation unit 16 may include a coastline database (DB) 161 that contains the shape of a coastline linked with location information by using coordinates. The geonavigation unit 16 may check a ground image against the coastline database 161 to obtain information of a self-position of the unmanned vehicle 1. Moreover, the geonavigation unit 16 may output a measurement propriety signal and information on the self-position of the unmanned vehicle 1 obtained by the geonavigation unit 16, to the controller 20. The measurement propriety signal may contain information indicating the propriety of execution of the position measurement. Hereinafter, the self-position of the unmanned vehicle 1 obtained by the geonavigation unit 16 is referred to as a "geonavigation position".

The ground information to be used by the geonavigation unit 16 may not be limited to the shape of a coastline, and may be any information that enables identification of the self-position by checking against the ground image. For example, the ground information may include various types of geographic information such as information of a road, a railroad, and a building, in addition to topographic information. In such cases, a database containing corresponding geographic information may be required.

The celonavigation unit 17 may obtain information on a self-position of the unmanned vehicle 1 on the basis of celestial information observed from the unmanned vehicle 1. For example, the celonavigation unit 17 may include a celestial body database (DB) 171 that contains information of a celestial body, such as the sun, the moon, a satellite, a planet, a fixed star, or an artificial celestial body, linked with location information by using coordinates. The celonavigation unit 17 may check a sky image or a celestial image against the celestial body database 171 in conjunction with an altitude of the unmanned vehicle 1, an azimuth of the celestial body, and the time of observing the celestial body, to obtain information on the self-position of the unmanned vehicle 1. Moreover, the celonavigation unit 17 may output a measurement propriety signal and the information on the self-position of the unmanned vehicle 1 obtained by the celonavigation unit 17, to the controller 20. The measurement propriety signal contains information indicating the propriety of execution of the position measurement. Hereinafter, the self-position of the unmanned vehicle 1 obtained by the celonavigation unit 17 is referred to as a "celonavigation position".

The storage 18 may be a memory that holds a program directed to implementing various functions of the self-position measuring device 10 and data and that also serves as a workspace. In the implementation of the technology, the storage 18 may preliminarily store a self-position measuring program 180.

The self-position measuring program 180 may be a program directed to causing the controller 20 to execute a self-position measuring process, which is described later.

The controller 20 may perform a central control of each of the units of the unmanned vehicle 1 including the self-position measuring device 10.

In the implementation of the technology, as illustrated in FIG. 2, the controller 20 may include a GPS use propriety determining unit 21, a GPS unavailable time measuring unit 22, a composite navigation unit 23, and a flight guidance controlling unit 24.

The GPS use propriety determining unit 21 may determine the propriety of using the GPS position or the GPS signal, on the basis of the information output from the GPS receiver 14, the inertial navigation unit 15, the geonavigation unit 16, and the celonavigation unit 17. For example, the GPS use propriety determining unit 21 may compare the GPS position with the self-position of the unmanned vehicle 1 measured by each of the navigation units. Further, the GPS use propriety determining unit 21 may thereby evaluate the reliability of the GPS position, for example, whether the GPS signal is impersonated or is jammed, or not, to determine the propriety of using the GPS position (refer to FIG. 6). Details of the determination method are described later. After determining the propriety of using the GPS position, the GPS use propriety determining unit 21 may output a GPS use propriety signal containing information on the result of the determination, to the GPS unavailable time measuring unit 22.

On a basis of the GPS use propriety signal output from the GPS use propriety determining unit 21, the GPS unavailable time measuring unit 22 may measure a time that has passed after the GPS position was determined as being unsuitable for use. Hereinafter, this time is referred to as a "GPS unavailable time". Further, the GPS unavailable time measuring unit 22 may output the measured GPS unavailable time to the composite navigation unit 23.

Figure 7:
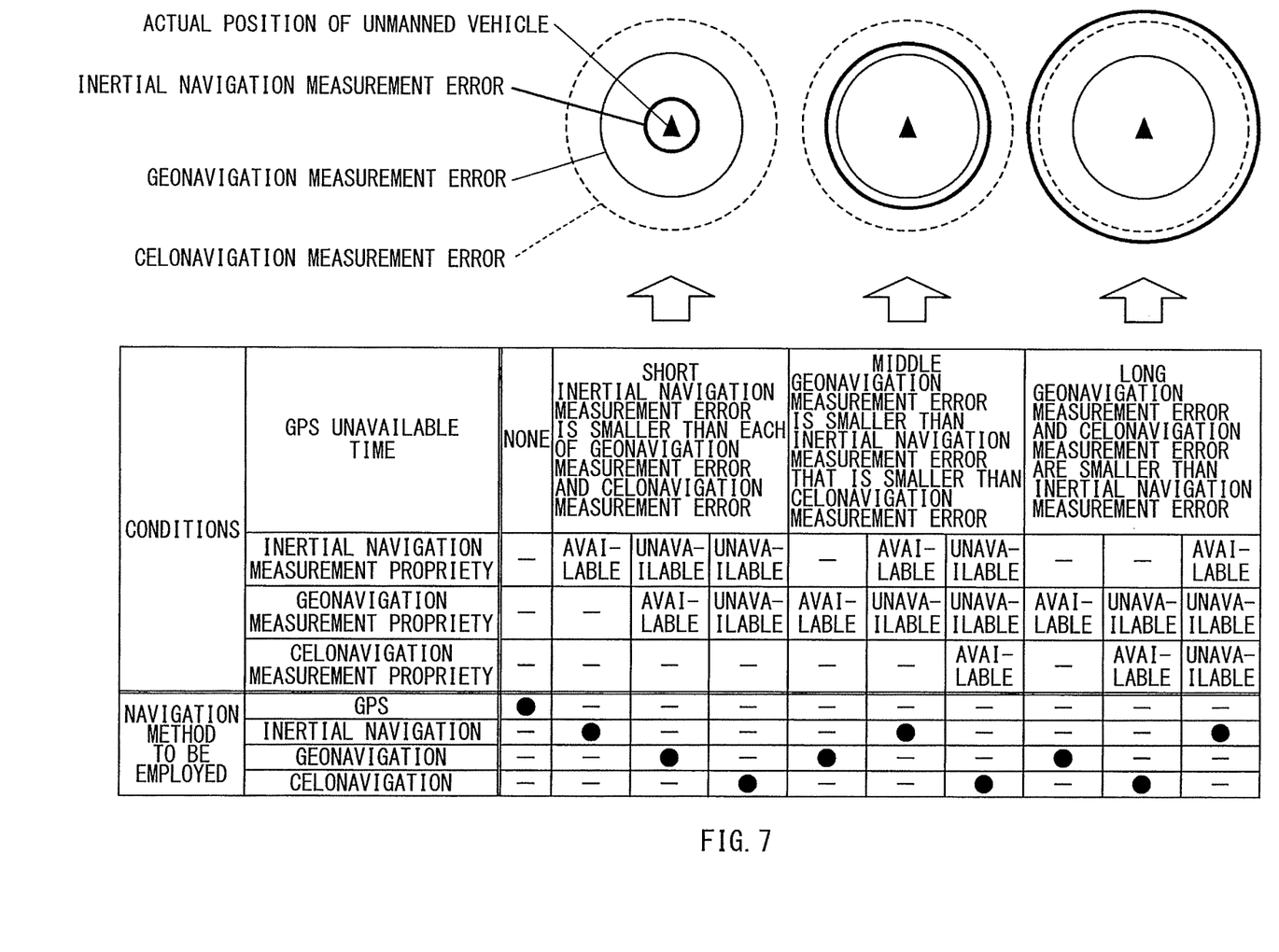
FIG. 7 is a diagram describing contents of selection of a navigation method in the self-position measuring process.

The composite navigation unit 23 may select the use of the navigation method or the GPS that has the highest accuracy or generates the least measurement error among the available methods, on the basis of, for example, the GPS unavailable time output from the GPS unavailable time measuring unit 22 or the measurement propriety signal output from each of the navigation units (refer to FIG. 7). Further, the composite navigation unit 23 may output, as a composite navigation position, the self-position of the unmanned vehicle 1 measured by the selected navigation method, to the flight guidance controlling unit 24.

The flight guidance controlling unit 24 may control the flight of the unmanned vehicle 1 by using the composite navigation position output from the composite navigation unit 23 as an actual self-position of the unmanned vehicle 1.

[Operation of Self-Position Measuring Device]

Next, operation of the self-position measuring device 10 in the self-position measuring process is described.

Figure 3:
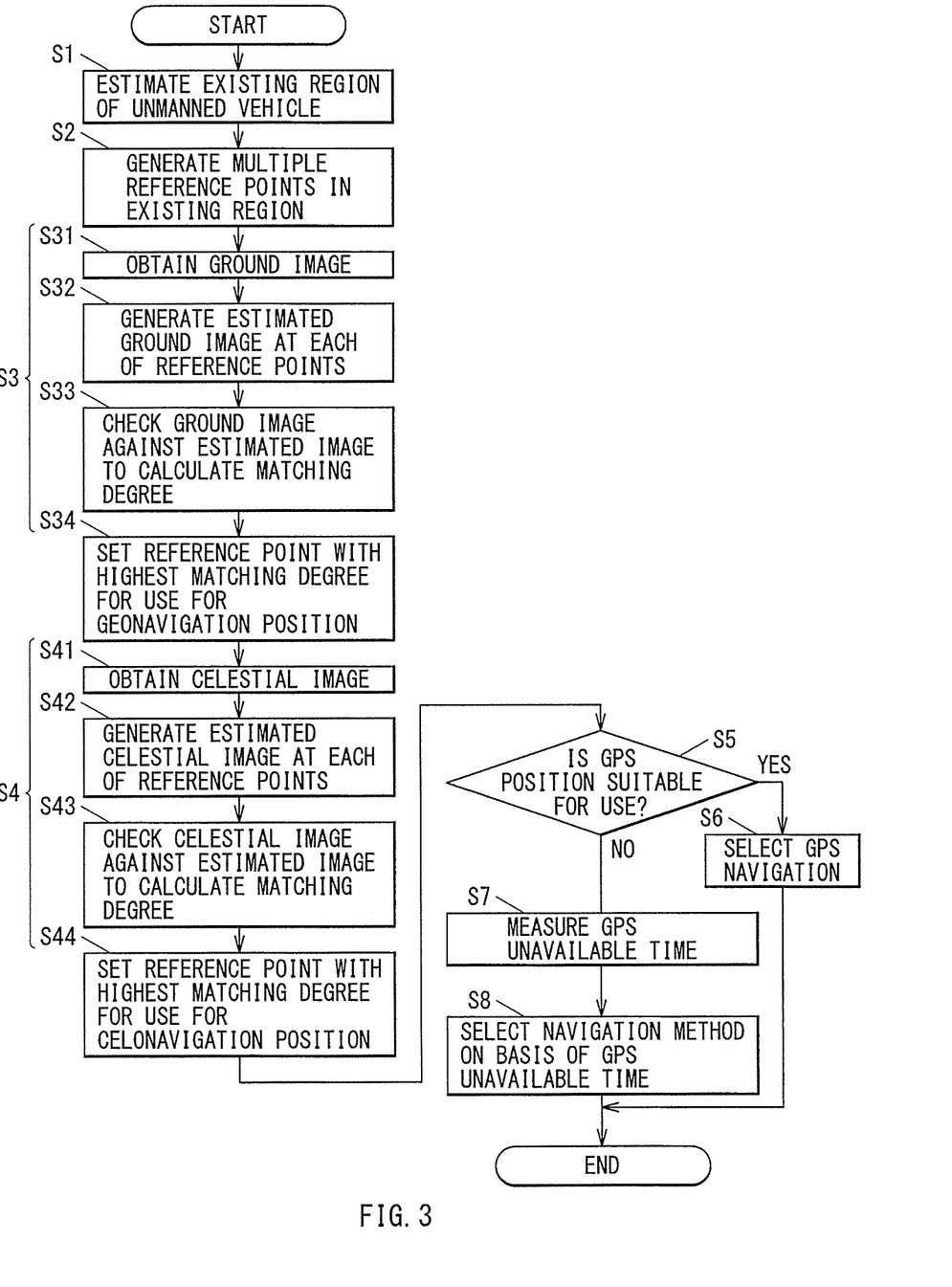
FIG. 3 is a flowchart illustrating a flow of a self-position measuring process.
Figure 4:
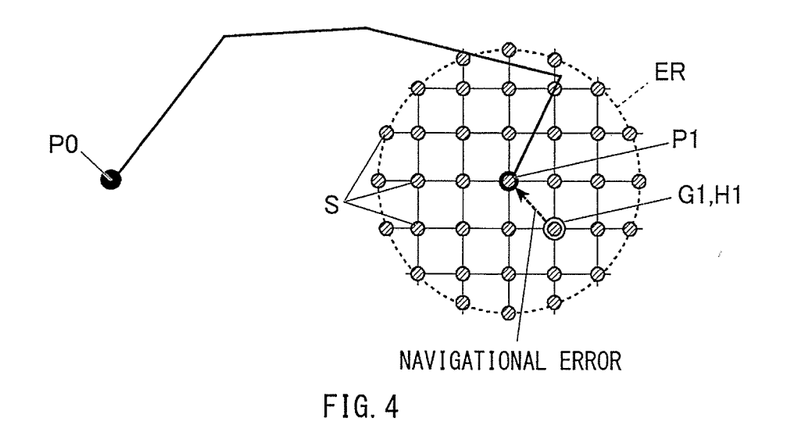
FIG. 4 is a diagram for explaining the self-position measuring process.
Figure 5A:
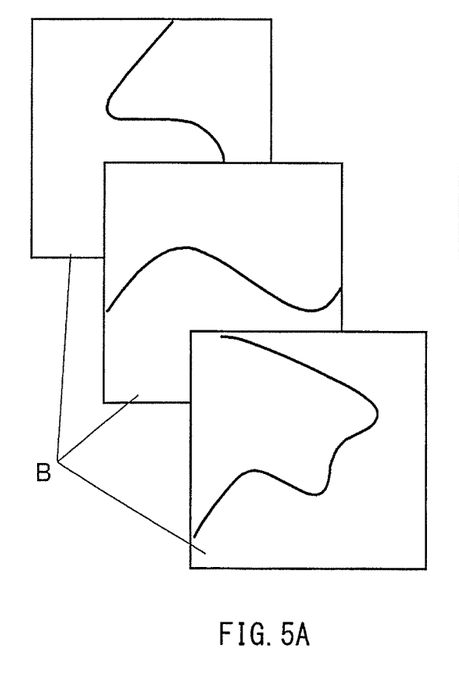
FIGS. 5A and 5B are diagrams for explaining the self-position measuring process.
Figure 5B:
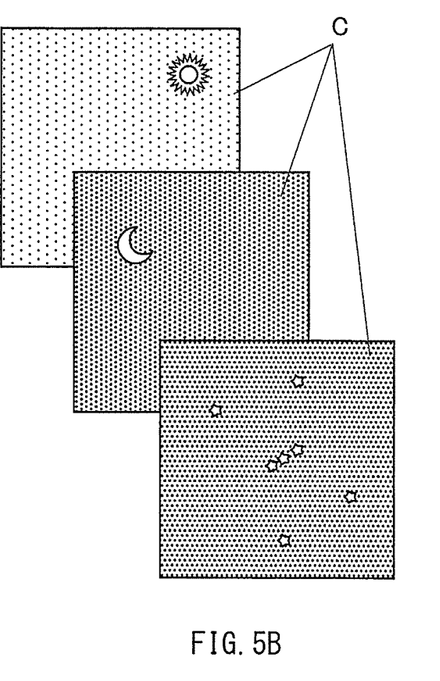

FIG. 3 is a flowchart illustrating a flow of the self-position measuring process. FIG. 4 and FIGS. 5A and 5B are diagrams for explaining the self-position measuring process.

Figure 6:
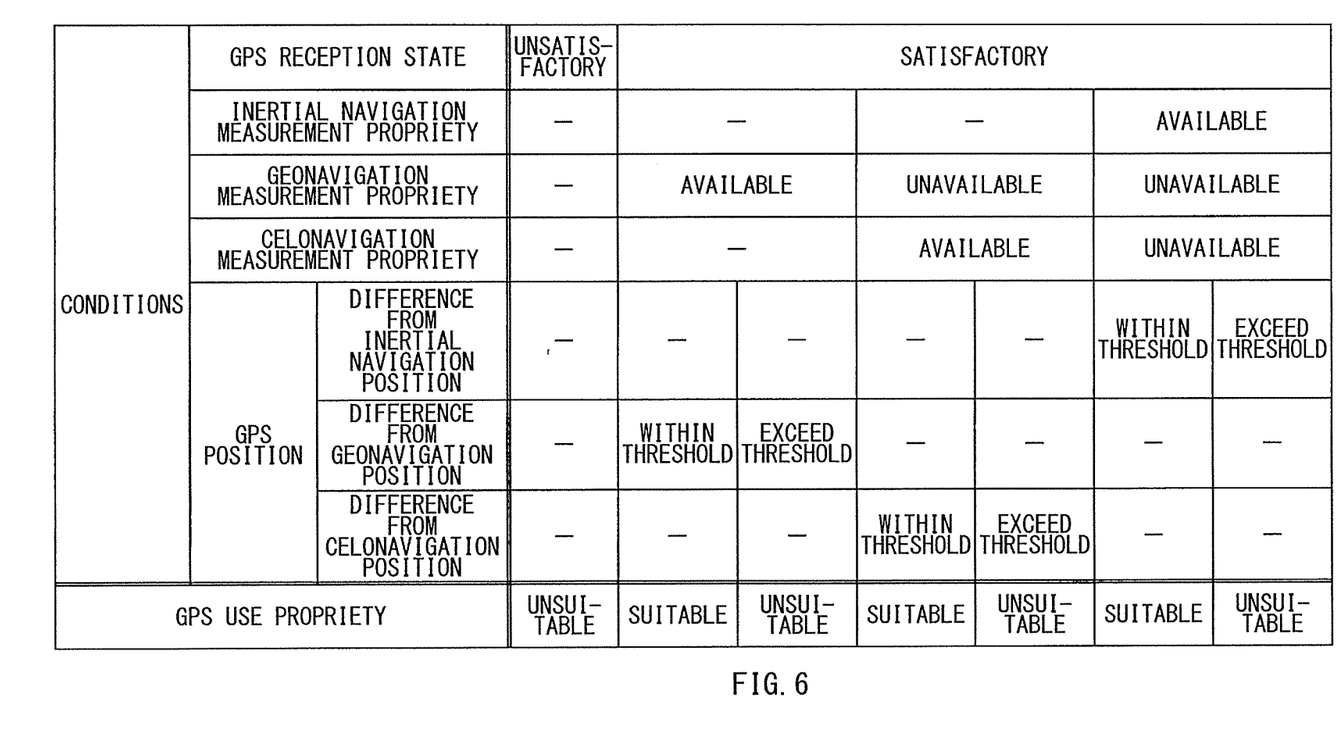
FIG. 6 is a diagram describing contents of determination of propriety of using a GPS position in the self-position measuring process.

FIG. 6 is a diagram describing contents of the determination of the propriety of using the GPS position in the self-position measuring process. FIG. 7 is a diagram describing contents of the selection of the navigation method in the self-position measuring process.

In the self-position measuring process, the accuracy of the inertial navigation position measured by the inertial navigation unit 15 may be checked by using geonavigation and celonavigation, and other navigation position may be employed as necessary. Thus, the self-position measuring process enables highly accurate measurement of the self-position of the unmanned vehicle 1. The self-position measuring process may be executed in response to the expanded self-position measuring program 180 that is read from the storage 18 by the controller 20. The self-position measuring process may, for example, be repeatedly executed at a predetermined time interval.

As illustrated in FIGS. 3 and 4, after the self-position measuring process is started, first, the controller 20 may estimate an existing region ER of the unmanned vehicle 1 that is flying at a specific time, on the basis of the position measured by the inertial navigation unit 15 (the inertial navigation position) (step S1).

In the implementation of the technology, the controller 20 may set an existing region ER containing a true self-position of the unmanned vehicle 1. This existing region ER may be a circular region in a horizontal plane containing an inertial navigation position P1 at a time T1 at its center and having a radius of a length of the measurement error of the inertial navigation position at the time T1. The inertial navigation position P1 may be an inertial navigation position that is measured by not-aided inertial navigation using only an inertial sensor. The measurement error of the inertial navigation position may be calculated as an accumulation value of positional measurement errors that occur as the time elapses from a time T0 to T1. The time T0 may be the latest time at which an accurate self-position was obtained, such as the time the unmanned vehicle 1 took off or the time the GPS worked normally. The inertial navigation position or the GPS position at the time T0 may be represented as P0 and used as a reference.

Thereafter, the controller 20 may divide the existing region ER into meshes and generate multiple reference points S (step S2).

In the implementation of the technology, the controller 20 may divide the existing region ER into a square grid and set a reference point S at each of intersection points of the grid lines and at each of intersection points of the grind lines and the boundary line of the existing region ER. The manner of dividing the existing region ER and the number of the reference points S to be generated may not be particularly limited.

Thereafter, the controller 20 may make the geonavigation unit 16 measure a geonavigation position (step S3).

At this stage, first, the controller 20 may obtain a photographed image of a ground at the inertial navigation position P1, which is taken by the optical camera 13, to extract a coastline shape from this photographed image (step S31).

Further, the controller 20 may make the geonavigation unit 16 generate an estimated image B containing a coastline shape (refer to FIG. 5A) on the basis of latitude and longitude of the corresponding reference point S, the altitude of the unmanned vehicle, and the coastline database 161 (step S32). The estimated image B may be an image expected to be obtained in a case where the ground is photographed at each of the reference points S in the existing region ER.

Thereafter, the geonavigation unit 16 may check the coastline line shape in the photographed image taken by the optical camera 13, against the coastline shape in the estimated image B at each of the reference points S to calculate a matching degree at each of the reference points S (step S33).

Further, the geonavigation unit 16 may extract a reference point S that corresponds to an estimated image B with the highest matching degree and may use the position of this reference point S, which is described by coordinates, as a geonavigation position G1 at the time T1 (step S34).

Thereafter, the controller 20 may make the celonavigation unit 17 measure a celonavigation position (step S4).

At this stage, first, the controller 20 may obtain a photographed image of the sky or a celestial body at the inertial navigation position P1, which is taken by the optical camera 13, to extract a primary celestial body such as the sun, the moon, or a first-magnitude star, from this photographed image (step S41).

Further, the controller 20 may make the celonavigation unit 17 generate a celestial image C (refer to FIG. 5B) on the basis of latitude and longitude of the corresponding reference point S, the altitude of the unmanned vehicle, and the celestial body database 171 (step S42). The celestial image C may be an image expected to be obtained in a case where the sky is photographed at each of the reference points S in the existing region ER.

Thereafter, the celonavigation unit 17 may check the primary celestial body in the photographed image taken by the optical camera 13, against the celestial image C at each of the reference points S to calculate a matching degree at each of the reference points S (step S43).

Further, the celonavigation unit 17 may extract a reference point S that corresponds to a celestial image C with the highest matching degree and may use the position of this reference point S, which is described by coordinates, as a celonavigation position H1 at the time T1 (step S44).

Although FIG. 4 illustrates an example in which the celonavigation position H1 agrees with the geonavigation position G1, the celonavigation position H1 and the geonavigation position G1 may not agree with each other in some cases.

Thereafter, the controller 20 may make the GPS use propriety determining unit 21 determine the propriety of using the GPS position (step S5).

At this stage, the GPS use propriety determining unit 21 may evaluate the reliability of the GPS position on the basis of the reception state of the GPS signal and the GPS position, which are output from the GPS receiver 14, and by referring to the measurement propriety information and the navigation position, which are output from each of the inertial navigation unit 15, the geonavigation unit 16, and the celonavigation unit 17.

For example, as illustrated in FIG. 6, the GPS use propriety determining unit 21 may first determine the GPS position as being unsuitable for use, in a case where the reception state of the GPS signal is not satisfactory. In a case where the reception state of the GPS signal is satisfactory, the GPS use propriety determining unit 21 may select one that was appropriately measured and that has the highest measurement accuracy, from among the geonavigation position, the celonavigation position, and the inertial navigation position, on the basis of each of the measurement propriety information. In this case, the measurement accuracies of these navigation positions are higher in the order of the geonavigation position, the celonavigation position, and the inertial navigation position.

The GPS use propriety determining unit 21 may compare the selected navigation position with the GPS position. If the difference is within a predetermined threshold, the GPS use propriety determining unit 21 may determine the GPS position as being suitable for use. Otherwise, if the difference exceeds the predetermined threshold, the GPS use propriety determining unit 21 may determine the GPS position as being unsuitable for use.

In a case where the GPS use propriety determining unit 21 determines the GPS position as being suitable for use in step S5, that is, step S5 is "YES", the controller 20 may make the composite navigation unit 23 select the GPS navigation method based on the GPS position as a navigation method with the highest accuracy or the least measurement error, as illustrated in FIG. 7 (step S6).

The composite navigation unit 23 may output the GPS position as a composite navigation position, to the flight guidance controlling unit 24 and may terminate the self-position measuring process.

In a case where the GPS use propriety determining unit 21 determines the GPS position as being unsuitable for use in step S5, that is, step S5 is "NO", the controller 20 may make the GPS unavailable time measuring unit 22 measure a GPS unavailable time (step S7). The GPS unavailable time measuring unit 22 may output the measured GPS unavailable time to the composite navigation unit 23.

Thereafter, the controller 20 may make the composite navigation unit 23 select one method with the highest accuracy or the least measurement error from among inertial navigation, geonavigation, and celonavigation, on the basis of the GPS unavailable time measured in step S7 (step S8).

At this stage, a navigation method with the highest accuracy may be selected on the basis of the GPS unavailable time measured in step S7 and the measurement propriety information output from each of the inertial navigation unit 15, the geonavigation unit 16, and the celonavigation unit 17. For example, as the GPS unavailable time increases, the measurement error in inertial navigation may increase accumulatively because the inertial navigation position is not corrected during that time. On the basis of this assumption, a navigation method with the highest accuracy may be selected in view of the relationship between the measurement error in inertial navigation and the measurement error in geonavigation or celonavigation. It may be also assumed that the measurement error in geonavigation is smaller than the measurement error in celonavigation at any time.

For example, as illustrated in FIG. 7, the composite navigation unit 23 may first sort the measured GPS unavailable time as being "short", "middle", or "long", which are time ranges set in advance.

In a case of sorting the GPS unavailable time as being "short", the composite navigation unit 23 may determine the measurement error in inertial navigation as being smaller than the measurement errors in geonavigation and celonavigation.

In a case of sorting the GPS unavailable time as being "middle", the composite navigation unit 23 may determine the measurement error in inertial navigation as being in a degree between the measurement error in geonavigation and the measurement error in celonavigation.

In a case of sorting the GPS unavailable time as being "long", the composite navigation unit 23 may determine the measurement error in inertial navigation as being greater than the measurement errors in geonavigation and celonavigation.

On the basis of this magnitude relationship of these navigational errors of the navigation methods and the measurement propriety information from each of the navigation units, the composite navigation unit 23 may select the use of the navigation method with the highest measurement accuracy or the least measurement error, by which the position was appropriately measured, from among geonavigation, celonavigation, and inertial navigation.

Thereafter, the composite navigation unit 23 may output, as a composite navigation position, the navigation position measured by the selected navigation method, to the flight guidance controlling unit 24 and may terminate the self-position measuring process.

[Example Effects]

As described above, in the implementation of the technology, a photographed image that is actually taken is checked against an estimated image generated on the basis of the coastline database 161 or the celestial body database 171, to extract the position of a reference point S with the highest matching degree.

At this time, the checking process may be performed on only the multiple reference points S in the existing region ER of the unmanned vehicle 1, which is set on the basis of the inertial navigation position. This enables reduction in the calculation load compared with an existing technique of simply using a topographic database or a celestial database in a checking process.

On the basis of the position of the reference point S extracted in the checking process, a navigation method with less measurement error is selected as a method of measuring a self-position. This enables improvement in the measurement accuracy of the self-position of the unmanned vehicle 1 without using an external signal such as a GPS signal.

Thus, the self-position of the unmanned vehicle 1 is measured at a calculation load that is smaller than the calculation load in an existing process, without the need for an external signal.

According to one implementation of the technology, obtained actual information is checked against the database of at least of the geographic information and celestial information, and a position with a highest matching degree is extracted.

At this time, the checking process may be performed on only the multiple reference points in the existing region of the movable body, which is set on the basis of the inertial navigation position. This enables reduction in the calculation load compared with an existing technique of simply using a topographic database or a celestial database in a checking process.

On the basis of the position of the reference point extracted in the checking process, a navigation method with less measurement error is selected as a method of measuring a self-position. This enables improvement in the measurement accuracy of the self-position of the movable body without using an external signal such as a GPS signal.

Thus, the self-position of the movable body is measured at a calculation load that is smaller than the calculation load in an existing process, without the need for an external signal.

In a case where the difference between the GPS position and each of the inertial navigation position, the geonavigation position, and the celonavigation position is within a predetermined threshold, the GPS signal is determined as being suitable for use. Thus, whether the GPS signal is impersonated or is jammed, or not, that is, the reliability of the GPS signal, is easily evaluated.

A navigation method with less navigational error is selected from among inertial navigation, geonavigation, and celonavigation, on the assumption that the measurement error in the inertial navigation position increases as the GPS unavailable time increases. Thus, the navigation method selection is easily performed on the basis of only the GPS unavailable.

It is configured to be able to use each of geonavigation and celonavigation to obtain redundancy. Thus, the self-position measurement is appropriately performed even in adverse conditions, for example, in a case where the upper space or the lower space of the unmanned vehicle 1 is clouded.

[Modification Examples]

It is to be noted that the technology is not limitedly applicable to the foregoing implementations. It should be appreciated that modifications and alterations may be made by persons skilled in the art without departing from the scope as defined by the appended claims or the equivalents thereof.

In the implementation of the technology described above, the self-position measuring device 10 may include both the geonavigation unit 16 and the celonavigation unit 17 so as to be able to use both geonavigation and celonavigation. However, for example, it may be enough to configure the self-position measuring device 10 so as to be able to use at least one of geonavigation and celonavigation.

The optical camera 13 may be used to obtain a photographed image of the ground in measuring a geonavigation position. However, a distance measuring unit such as a radar may also be used to obtain information of the ground, instead of the optical camera 13.

The movable body of the technology may not be limited to an unmanned vehicle, such as a UAV, and for example, may be a manned aircraft, a manned or an unmanned vessel, or a manned or an unmanned vehicle.

The controller 20 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 20 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 20 illustrated in FIG. 1.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A self-position measuring device comprising:
an inertial navigation unit configured to measure an inertial navigation position as a self-position of a movable body;
a database of at least one of geographic information and celestial information;
a reference point generator configured to estimate an existing region of the movable body on a basis of the inertial navigation position measured as the self-position by the inertial navigation unit and divide the existing region to generate multiple reference points;
an information obtaining unit configured to obtain at least one, of the geographic information and the celestial information, which corresponds to the database, at the inertial navigation position;
an information generator configured to generate estimated information that is expected to be obtained when at least the one of the geographic information and the celestial information is obtained, at each of the multiple reference points on a basis of the database;
a position extractor configured to check at least the one of the geographic information and the celestial information, against the estimated information at each of the multiple reference points and extract a position of a specific reference point corresponding to specific estimated information with a highest matching degree;
a navigation method selector configured to select, on a basis of the specific reference point, a navigation method with less navigational error as a navigation method for measuring the self-position, from among multiple navigation methods including a navigation method using the inertial navigation unit and a navigation method determining the position of the specific reference point; and
a GPS receiver configured to receive a GPS signal containing position information from a GPS satellite,
wherein the inertial navigation unit corrects the inertial navigation position on a basis of the position information contained in the GPS signal, and
wherein the navigation method selector includes:
a GPS use propriety determining unit configured to evaluate reliability of the GPS signal on a basis of the position information contained in the GPS signal, the inertial navigation position, and the position of the specific reference point, to determine whether the GPS signal is suitable for use;
a GPS unavailable time measuring unit configured to measure a length of a GPS unavailable time that has passed after the GPS signal is determined as being unsuitable for use; and
a composite navigation unit configured to select the navigation method for measuring the self-position, on a basis of the length of the GPS unavailable time.

2. The self-position measuring device according to claim 1, wherein the GPS use propriety determining unit determines the GPS signal as being suitable for use when a difference between the position information contained in the GPS signal and one of the inertial navigation position and the position of the specific reference point is within a predetermined threshold.

3. The self-position measuring device according to claim 1, wherein the composite navigation unit selects a navigation method with less navigational error between the navigation method using the inertial navigation unit and the navigation method determining the position of the specific reference point, on an assumption that a navigational error of the inertial navigation position increases as the GPS unavailable time increases.

4. The self-position measuring device according to claim 2, wherein the composite navigation unit selects a navigation method with less navigational error between the navigation method using the inertial navigation unit and the navigation method determining the position of the specific reference point, on an assumption that a navigational error of the inertial navigation position increases as the GPS unavailable time increases.

5. The self-position measuring device according to claim 1, wherein
the database comprises a geographic database containing the geographic information and a celestial database containing the celestial information,
the information obtaining unit obtains actual information of each of the geographic information and the celestial information at the inertial navigation position,
the information generator generates, at each of the multiple reference points, estimated geographic information on a basis of the geographic database and generates, at each of the multiple reference points, estimated celestial information on a basis of the celestial database, the estimated geographic information being information expected to be obtained when the geographic information is obtained, the estimated celestial information being information expected to be obtained when the celestial information is obtained,
the position extractor checks the geographic information against the estimated geographic information at each of the multiple reference points, extracts a first reference point corresponding to specific estimated geographic information with a highest matching degree, as the specific reference point, and extracts a position of the first reference point as a geonavigation position, and
the position extractor checks the celestial information against the estimated celestial information at each of the multiple reference points, extracts a second reference point corresponding to specific estimated celestial information with a highest matching degree, as the specific reference point, and extracts a position of the second reference point as a celonavigation position.

6. The self-position measuring device according to claim 1, wherein the existing region is a circular region containing the inertial navigation position at its center and having a radius of a length of measurement error of the inertial navigation position obtained by the inertial navigation unit.

7. The self-position measuring device according to claim 1, wherein
the information obtaining unit is an imaging unit that obtains image information, and
the information generator generates an estimated image that is expected to be obtained when an image of at least the one of the geographic information and the celestial information is obtained.

8. The self-position measuring device according to claim 1, wherein the movable body is an unmanned aerial vehicle.

9. The self-position measuring device according to claim 1, wherein the database comprises a geographic database containing the geographic information and a celestial database containing the celestial information,
the information obtaining unit is an imaging unit that obtains actual image information corresponding to each of the geographic information and the celestial information at the inertial navigation position,
the actual image information of the geographic information is extracted from a photographed image of a ground captured with the imaging unit,
the actual image information of the celestial information is extracted from a photographed image of a sky or a celestial body captured with the imaging unit,
the information generator generates estimated geographic images each of which is corresponding to each of the multiple reference points on a basis of the geographic database, and generates estimated celestial images each of which is corresponding to each of the multiple reference points on a basis of the celestial database, the estimated geographic images being images expected to be obtained when the actual image information of the geographic information is obtained, the estimated celestial images being images expected to be obtained when the actual image information of the celestial information is obtained,
the position extractor checks the actual image information of the geographic information against the estimated geographic images, extracts a first reference point corresponding to specific estimated geographic image with a highest matching degree from the multiple reference points, and determines a position of the first reference point as a geonavigation position, and
the position extractor checks the actual image information of the celestial information against the estimated celestial images, extracts a second reference point corresponding to specific estimated celestial image with a highest matching degree from the multiple reference points, and determines a position of the second reference point as a celonavigation position.

10. A self-position measuring method executed by a self-position measuring device, the self-position measuring device including: an inertial navigation unit configured to measure an inertial navigation position as a self-position of a movable body; and a database of at least one of geographic information and celestial information, the self-position measuring method comprising:
estimating an existing region of the movable body on a basis of the inertial navigation position measured as the self-position by the inertial navigation unit and dividing the existing region to generate multiple reference points;
obtaining at least one, of the geographic information and the celestial information, which corresponds to the database, at the inertial navigation position;
generating estimated information that is expected to be obtained when at least the one of the geographic information and the celestial information is obtained, at each of the multiple reference points on a basis of the database;
checking at least the one of the geographic information and the celestial information, against the estimated information at each of the multiple reference points and extracting a position of a specific reference point corresponding to specific estimated information with a highest matching degree;
selecting, on a basis of the specific reference point, a navigation method with less navigational error as a navigation method for measuring the self-position, from among multiple navigation methods including a navigation method using the inertial navigation unit and a navigation method determining the position of the specific reference point;
receiving a GPS signal containing position information from a GPS satellite; and
correcting the inertial navigation position on a basis of the position information contained in the GPS signal, wherein selecting the navigation method includes:
evaluating reliability of the GPS signal on a basis of the position information contained in the GPS signal, the inertial navigation position, and the position of the specific reference point, to determine whether the GPS signal is suitable for use;
measuring a length of a GPS unavailable time that has passed after the GPS signal is determined as being unsuitable for use; and
selecting the navigation method for measuring the self-position, on a basis of the length of the GPS unavailable time.

11. A non-transitory storage medium storing a self-position measuring program that causes a self-position measuring device to execute a method, the self-position measuring device including: an inertial navigation unit configured to measure an inertial navigation position as a self-position of a movable body; and a database of at least one of geographic information and celestial information, the method comprising:
estimating an existing region of the movable body on a basis of the inertial navigation position measured as the self-position by the inertial navigation unit and dividing the existing region to generate multiple reference points;
obtaining at least one, of the geographic information and the celestial information, which corresponds to the database, at the inertial navigation position;
generating estimated information that is expected to be obtained when at least the one of the geographic information and the celestial information is obtained, at each of the multiple reference points on a basis of the database;
checking at least the one of the geographic information and the celestial information, against the estimated information at each of the multiple reference points and extracting a position of a specific reference point corresponding to specific estimated information with a highest matching degree;
selecting, on a basis of the specific reference point, a navigation method with less navigational error as a navigation method for measuring the self-position, from among multiple navigation methods including a navigation method using the inertial navigation unit and a navigation method determining the position of the specific reference point;
receiving a GPS signal containing position information from a GPS satellite; and
correcting the inertial navigation position on a basis of the position information contained in the GPS signal,
wherein selecting the navigation method includes:
evaluating reliability of the GPS signal on a basis of the position information contained in the GPS signal, the inertial navigation position, and the position of the specific reference point, to determine whether the GPS signal is suitable for use;
measuring a length of a GPS unavailable time that has passed after the GPS signal is determined as being unsuitable for use; and
selecting the navigation method for measuring the self-position, on a basis of the length of the GPS unavailable time.

12. A self-position measuring device comprising:
an inertial navigation unit that measures an inertial navigation position as a self-position of a movable body;
a database of at least one of geographic information and celestial information; and
circuitry configured to
estimate an existing region of the movable body on a basis of the inertial navigation position measured as the self-position by the inertial navigation unit and divide the existing region to generate multiple reference points,
obtain at least one, of the geographic information and the celestial information, which corresponds to the database, at the inertial navigation position,
generate estimated information that is expected to be obtained when at least the one of the geographic information and the celestial information is obtained, at each of the multiple reference points on a basis of the database,
check at least the one of the geographic information and the celestial information, against the estimated information at each of the multiple reference points and extract a position of a specific reference point corresponding to specific estimated information with a highest matching degree,
select, on a basis of the specific reference point, a navigation method with less navigational error as a navigation method for measuring the self-position, from among multiple navigation methods including a navigation method using the inertial navigation unit and a navigation method determining the position of the specific reference point,
receive a GPS signal containing position information from a GPS satellite, and
correct the inertial navigation position on a basis of the position information contained in the GPS signal,
wherein selecting the navigation method includes:
evaluating reliability of the GPS signal on a basis of the position information contained in the GPS signal, the inertial navigation position, and the position of the specific reference point, to determine whether the GPS signal is suitable for use;
measuring a length of a GPS unavailable time that has passed after the GPS signal is determined as being unsuitable for use; and
selecting the navigation method for measuring the self-position, on a basis of the length of the GPS unavailable time.

13. The self-position measuring device according to claim 12, wherein the database comprises a geographic database containing the geographic information and a celestial database containing the celestial information,
the circuitry includes an imaging unit that obtains actual image information corresponding to each of the geographic information and the celestial information at the inertial navigation position,
the actual image information of the geographic information is extracted from a photographed image of a ground captured with the imaging unit,
the actual image information of the celestial information is extracted from a photographed image of a sky or a celestial body captured with the imaging unit,
the circuitry generates estimated geographic images each of which is corresponding to each of the multiple reference points on a basis of the geographic database, and generates estimated celestial images each of which is corresponding to each of the multiple reference points on a basis of the celestial database, the estimated geographic images being images expected to be obtained when the actual image information of the geographic information is obtained, the estimated celestial images being images expected to be obtained when the actual image information of the celestial information is obtained, the circuitry checks the actual image information of the geographic information against the estimated geographic images, extracts a first reference point corresponding to specific estimated geographic image with a highest matching degree from the multiple reference points, and determines a position of the first reference point as a geonavigation position, and the circuitry checks the actual image information of the celestial information against the estimated celestial images, extracts a second reference point corresponding to specific estimated celestial image with a highest matching degree from the multiple reference points, and determines a position of the second reference point as a celonavigation position.

* * * * *